US009736616B2

(12) United States Patent
Madonna et al.

(10) Patent No.: US 9,736,616 B2
(45) Date of Patent: Aug. 15, 2017

(54) CONFIGURATION CONNECTION DEVICE (71) Applicant: Savant Systems, LLC, Hyannis, MA (US)

(72) Inventors: Robert Madonna, Osterville, MA (US); Michael Silva, East Sandwich, MA (US); Cory Haflett, Centerville, MA (US); Michael Noonan, Sandwich, MA (US); Zev Eisenberg, Hyannis, MA (US); Duarte Avelar, Plymouth, MA (US); Matthew Aguiar, Fall River, MA (US)

(73) Assignee: Savant Systems, LLC, Hyannis, MA (US)

(*) Notice: Subject to any disclaimer, the term of this patent is extended or adjusted under 35 U.S.C. 154(b) by 338 days.

(21) Appl. No.: 13/923,826

(22) Filed: Jun. 21, 2013

(65) Prior Publication Data

US 2014/0376528 A1    Dec. 25, 2014

(51) Int. Cl.
*G06F 15/177* (2006.01)
*H04W 4/00* (2009.01)
(Continued)

(52) U.S. Cl.
CPC ......... *H04W 4/001* (2013.01); *H04L 12/2814* (2013.01); *H04L 41/26* (2013.01);
(Continued)

(58) Field of Classification Search
CPC . H04L 12/28; H04L 12/2803; H04L 12/2816; H04L 12/2818; H04L 12/282;
(Continued)

(56) References Cited

U.S. PATENT DOCUMENTS

| 7,490,350 B1* | 2/2009 | Murotake | G06F 21/85 726/11 |
| 2007/0255860 A1* | 11/2007 | Chen | G06F 9/4411 710/8 |

(Continued)

FOREIGN PATENT DOCUMENTS

WO    WO-2013/067569 A1    5/2013

OTHER PUBLICATIONS

"Notification of Transmittal of the International Search Report and the Written Opinion of the International Searching Authority, or the Declaration," International Filing Date: Jun. 9, 2014, International Application No. PCT/US2014/041474, Applicant: Savant Systems, LLC., Date of Mailing: Oct. 23, 2014, pp. 1-11.

*Primary Examiner* — Dhairya A Patel
(74) *Attorney, Agent, or Firm* — Cesari & McKenna, LLP; James A. Blanchette (57) ABSTRACT

In one embodiment, a connection device couples a mobile device having a touch-sensitive display screen to a component of home automation system. The connection device couples a wired serial communication interface of the mobile device to a wired serial communication interface of the component. The mobile device executes a configuration application (app), whose a user interface is displayed on the touch-sensitive display screen. Using the user interface, a user may configure the component to join a Wi-Fi network, as well as configure more advanced settings of the component. Similarly, in response to further input on the user interface, the configuration app on the mobile device may send additional control commands via the connection device, or the Wi-Fi network, to the component, to configure additional settings of the component.

22 Claims, 9 Drawing Sheets

(51) Int. Cl.
  *H05B 37/02* (2006.01)
  *H04L 12/24* (2006.01)
  *H04L 12/28* (2006.01)

(52) U.S. Cl.
  CPC .... *H05B 37/0272* (2013.01); *H04L 2012/285* (2013.01); *H04L 2012/2841* (2013.01)

(58) Field of Classification Search
  CPC ............... H04L 12/2809; H04L 12/281; H04L 12/2812; H04L 12/2814; H04L 12/2838; H04L 12/2821; H04L 12/2823
  See application file for complete search history.

(56) References Cited

U.S. PATENT DOCUMENTS

| | | | |
|---|---|---|---|
| 2009/0003240 A1* | 1/2009 | Negron | H04L 12/2807 370/254 |
| 2009/0178192 A1* | 7/2009 | Vassilev | E03C 1/232 4/668 |
| 2010/0141153 A1* | 6/2010 | Recker | H05B 33/0803 315/149 |
| 2012/0083228 A1* | 4/2012 | Baumert | H04B 3/542 455/90.3 |
| 2012/0203379 A1* | 8/2012 | Sloo | F24F 11/0086 700/276 |
| 2012/0306621 A1* | 12/2012 | Muthu | H05B 37/0272 340/8.1 |
| 2013/0010018 A1 | 1/2013 | Economy | |
| 2013/0026947 A1* | 1/2013 | Economy | H05B 37/0272 315/287 |
| 2013/0030589 A1* | 1/2013 | Pessina | H05B 37/0272 700/295 |
| 2013/0134774 A1* | 5/2013 | Kennedy | G06F 1/26 307/2 |
| 2013/0150004 A1* | 6/2013 | Rosen | H04W 8/22 455/414.1 |
| 2013/0236144 A1* | 9/2013 | Tong | G02B 6/4293 385/89 |
| 2013/0261807 A1* | 10/2013 | Zywicki | G05D 23/1905 700/278 |

* cited by examiner

CONFIGURATION CONNECTION DEVICE

BACKGROUND

Technical Field

The present disclosure relates generally to home automation systems and more specifically to a connection device for configuring components of a home automation system that are initially inaccessible on a Wi-Fi network.

Background Information

Home automation systems are becoming increasingly popular in both residential and commercial buildings. In a typical home automation system, one or more controllers organize the system. The controllers operates under directions from a user, received on user interface devices in communication with the controllers. The controllers may control endpoints that implement functions to change the environment, and in some cases collect environmental data. Depending on the type of home automation system, the nature of the controllers, user interface devices, and endpoints may vary. Further, the same device may sometimes operate as both a controller, a user interface device, and/or an endpoint, depending on its capabilities and current role. As used herein, the term "component" should be understood to refer generally to controllers, user interface devices, and/or endpoints of a home automation system.

A home automation system may include components related to any of a variety of different types of functions in the areas of lighting, climate control, audio/video, window shades and drapes, security and surveillance, communications, entry control, power management, and the like. For example, if the home automation system supports lighting control, controllers may include a lighting controller, user interface devices may include one or more remote controls and keypads, and endpoints may include load modules. Likewise, if the home automation system supports climate control, the controllers may include one or more heating ventilation and air conditioning (HVAC) controllers (or HVAC control functionality integrated into general purpose controllers), the user interface devices may include one or more remote controls, and the endpoints may include one or more thermostats, sensors, and the like.

Some components may support wireless networking, and join and communicate over wireless local area networks (WLANs), or more specifically Wi-Fi networks. As used herein the term "Wi-Fi network" refers to a WLAN that is based on one or more of the Institute of Electrical and Electronics Engineers' (IEEE) 802.11 standards. A Wi-Fi network may be used to pass control commands among the components to support ongoing home automation functions. While wireless networking circuitry may be readily integrated into components, configuring such components to join a Wi-Fi network and properly interact with one another may present challenges. Before a component has joined a Wi-Fi network, it may be inaccessible to other components via Wi-Fi communication.

In order to join a Wi-Fi network, a component typically must be configured with Wi-Fi settings, for example, a network name (e.g., service set identifier (SSID)), a security type (e.g., Wired Equivalent Privacy (WEP), Wi-Fi Protected Access (WPA) a password, addresses (e.g., an Internet Protocol (IP) address, a subnet mask, an IP address of a gateway/router), etc. Also, the component may need to have its role defined, have its firmware updated, and/or be configured with bindings and controller setting, before it can properly interact with other components. However, some components of home automation systems may lack robust user interfaces themselves that allow a user to easily configure these settings. A component, for example, a lighting controller, a keypad, etc., may lack any sort of display screen that could show such a user interface. Users may be required to undertake cumbersome and inefficient means to configure components Accordingly, there is a need for improved techniques for configuring components of home automation systems, including Wi-Fi enabled components that may initially be inaccessible on a Wi-Fi network.

SUMMARY

In one embodiment, a connection device is provided that couples a mobile device having a touch-sensitive display screen to a component (e.g., a controller, a user interface, or an endpoint) of a home automation system. The connection device couples a wired serial communication interface of the mobile device (e.g., a 30-pin dock interface, Lightning interface, Universal Serial Bus (USB) interface, etc.) to a wired serial communication interface (e.g., an RS232 interface or other type of interface) of the component of the home automation system. An authentication chip, processor, or other circuitry may be included internal to the connection device, and facilitate communication between the wired serial communication interfaces. The mobile device executes a configuration application (app), whose user interface is displayed on the touch-sensitive display screen. Using the user interface, a user may configure the component to join a Wi-Fi network, as well as configure more advanced settings of the component. For example, in response to input on the user interface, the configuration app on the mobile device may send control commands via the connection device to the component, to set a network name, a security type, a password, addresses, etc., to cause the component to join a Wi-Fi network. Similarly, in response to further input on the user interface, the configuration app on the mobile device may send additional control commands via the connection device, or the Wi-Fi network, to the component to configure additional settings (e.g., a role, firmware, bindings and controller settings, etc.) of the component. In this manner, a user may use the mobile device to configure a component of a home automaton system that may lack any sort of display screen itself capable of providing a robust user interface.

It should be understood that a variety of additional features and alternative embodiments may be implemented. This Summary is intended simply as an introduction to the reader, and does not indicate or imply that the examples mentioned herein cover all aspects of the invention, or are necessary or essential aspects of the invention.

BRIEF DESCRIPTION OF THE DRAWINGS

The description below refers to the accompanying drawings, of which.

DETAILED DESCRIPTION

Figure 1:
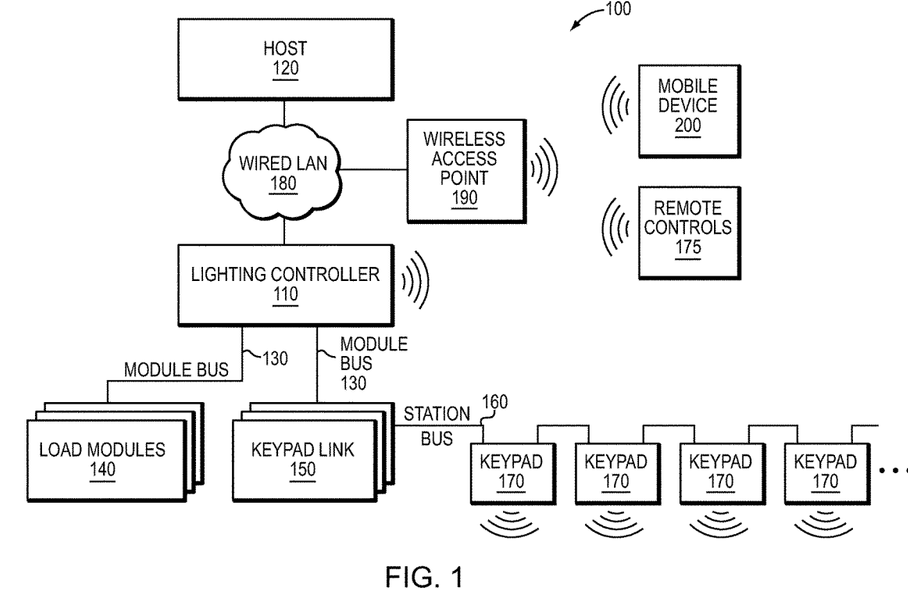
FIG. 1 is a block diagram of an architecture of a home automation system that focuses on lighting control.

FIG. 1 is a block diagram of an architecture of an example home automation system 100 that focuses on lighting control. The focus on lighting control is merely illustrative, and it should be understood that a home automation system may support a variety of different types of functions relating to lighting, climate control, audio/video, window shades and drapes, security and surveillance, communications, entry control, power management, and the like, and that the descriptions below are not limited to lighting control. A home automation system may be devoted to one of these functions, or a combination of multiple ones of these functions. A home automation system may be deployed in a residential home and the functions adapted to a residential environment. Alternatively, a home automation system may be deployed in a commercial building (such as an office building, store, factory, etc.) and these functions adapted to commercial requirements.

The example home automation system 100 is composed of a number of home automation components (e.g., controllers, a user interfaces, and endpoints) related to lighting control. The controllers include a lighting controller 110 and a host controller 120. The user interfaces include keypads 170, remote controls 175, and potentially mobile devices 200. The endpoint units include load modules, lamp modules (not shown), and the like.

The lighting controller 110 provides control and communication functionality, and supports, via a module bus 130, the load modules 140. The load modules include dimmer modules and relay modules that dim and/or switch individual lighting devices, when directed to do so by the lighting controller 110. Further, the lighting controller 110 supports, via a module bus 130, keypad link units 150 that are coupled, via a respective station bus 160, to keypads 170. The keypads 170 receive user input indicating lighting devices to dim and/or switch, which is provided back to the lighting controller 110.

The lighting controller 110 is coupled, via a wired local area network (LAN) 180 to the host controller 120. The host controller 120 is configured to control and monitor operations of the lighting controller 110, as well as to provide user interface interpretation and high-level control functions. One or more wireless access points 190 are coupled to the LAN 180, and support a WLAN, or more specifically, a Wi-Fi network. The Wi-Fi network is utilized by remote controls 175, and mobile devices 200. In addition to the remote controls 175 and mobile devices 200, one or more other components of the home automation system 100 may utilize the Wi-Fi network. For example, the lighting controller 110, keypads 170 and other components may be Wi-Fi enabled, and use the Wi-Fi network to supplement, or (alternatively) in place of, wired connections.

In addition to receiving user input to control ongoing operation of a home automation system 100, mobile devices 200 may be used to configure components of the home automation system 100. Each individual mobile device 200 may be used in one or both of these roles. As used herein, the term "mobile device" refers to an electronic device that is adapted to be transported on one's person and includes a wireless communication interface and a touch sensitive display screen. Devices such as tablet computers (e.g., the iPad® tablet available from Apple, Inc.), smartphones (e.g., the iPhone® smartphones available from Apple, Inc., and Android® smartphones available from various suppliers), and certain portable media players (e.g., such as the iPod® touch available from Apple, Inc.), are considered mobile devices. A desktop computer would not be considered a mobile device. When used in a control role, a mobile device 200 may execute a control application (app) and communicate with the host controller 120. When used in a configuration role, a mobile device 200 may execute a configuration app and communicate directly with individual non-controller components.

Figure 2:
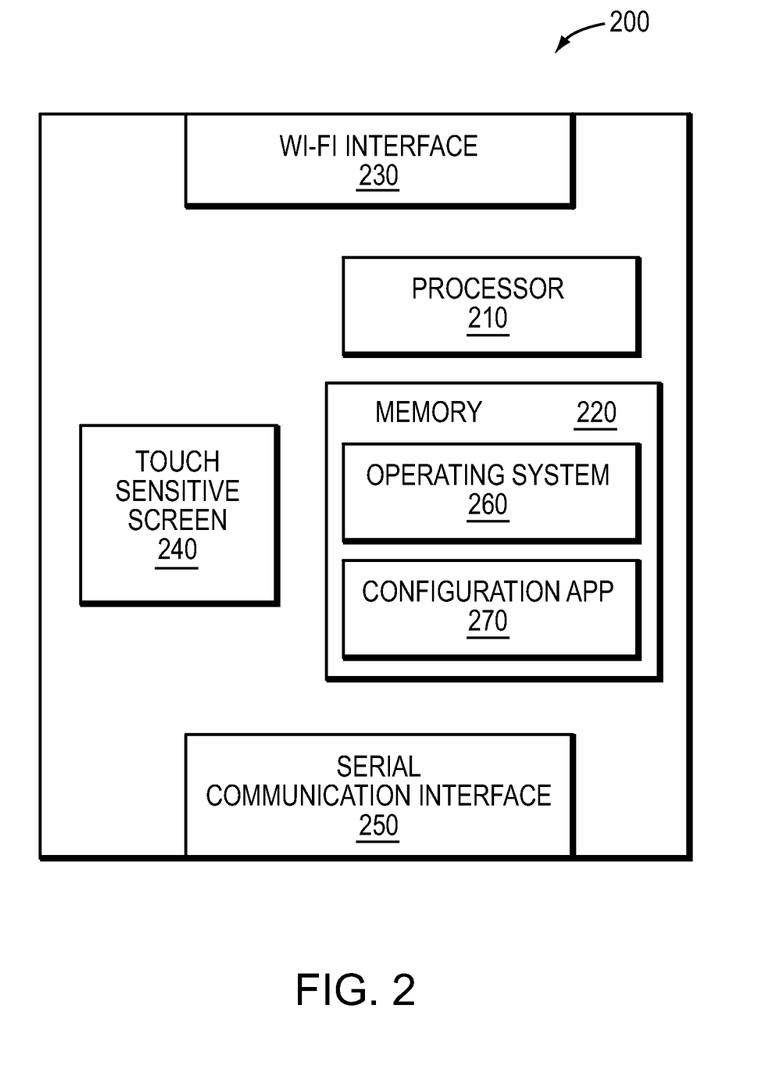
FIG. 2 is a block diagram of an example mobile device.

FIG. 2 is a block diagram of an example mobile device 200. The mobile device 200 includes a processor 210, a memory 220, a wireless network interface 230, a touch-sensitive screen 240, a wired serial communication interface 250, as well as other hardware. The processor 210 includes logic configured to execute software and manipulate data from data structures. The memory 220 includes a plurality of storage locations for storing the software and the data structures. The wireless network interface 230 facilitates communication over a WLAN, or more specifically a Wi-Fi network. The touch-sensitive display screen 240 may receive user input in the form of gestures (e.g., touches, swipes, multi-touch gestures, etc.) from a user. The serial communication interface 250 may be a 30-pin dock interface, a Lightning interface, a USB interface, or another type of interface.

An operating system 260, portions of which are resident in memory 220, functionally organizes the mobile device 200. The operating system 260 may be an IOS® operating system available from Apple, Inc., an Android® operating system available from Google, Inc, or another type of operating system. A configuration app 270 is executed in conjunction with the operating system 260, to permit the mobile device 200 to operate in a configuration role, to configure a component (e.g., a controller, a user interface, or an endpoint) of the home automation system 100. The configuration app 270 may display a user interface on the touch sensitive screen 270, and receive user input thereon. In addition, a control app (not shown) may also be stored in the memory 220 to permit the mobile device 200 to operate in a control role and control ongoing operation of the home automation system 100. The control app (not shown) may also display its user interface on the touch sensitive screen 270, and receive user input thereon.

As discussed above, sometimes a Wi-Fi enabled component of a home automation system 100 may not yet be configured with Wi-Fi settings needed to join the network. Further, the component may lack a display screen capable of providing a robust user interface for configuring these Wi-Fi settings, and other settings of the component. By coupling the serial communication interface 250 of the mobile device 200 to a serial communication interface of the component, via a special connection device, and using the configuration app 270 on the mobile device 200, a user may configure the Wi-Fi and other settings.

Figure 3:
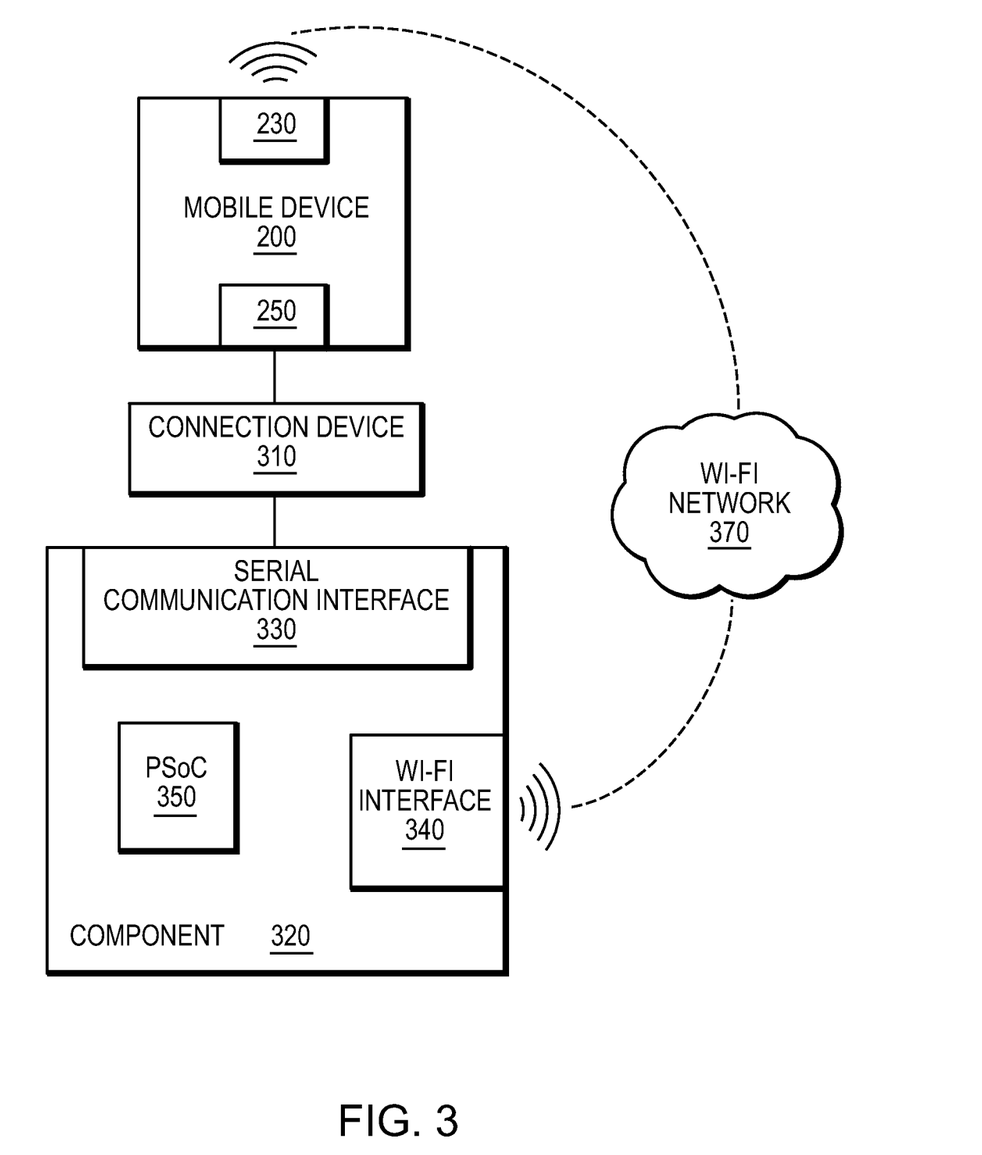
FIG. 3 is a block diagram of an example mobile device coupled via an example connection device to an example component.

FIG. 3 is a block diagram of an example mobile device 200 coupled via an example connection device 310 to an example component 320 (e.g., a controller, a user interface, or an endpoint) of a home automation system. The component includes a wired serial communication interface 330, a Wi-Fi Interface 340, as well as a Programmable System-on-Chip (PSoC) 350 that may support a programming environment. The connection device 310 couples the wired serial communication interface (e.g., 30-pin dock interface, Lightning interface, or USB interface, etc.) 250 of the mobile device 200 to the wired serial communication interface (e.g., a RS232 interface or other type of interface) 330 of the component 320. The connection device 310 may include hardware to support such a connection. For example, if the interface 250 is a Lightning interface and the interface 330 is an RS232 interface, the connection device 310 may include a processor, an authentication chip, as well as other hardware (not shown). Alternatively, if the interface 250 is a USB interface and the interface 330 is an RS232 interface, the connection device 310 may include a USB translation device as well as other hardware (not shown).

The mobile device 200 may detect when it is computed to a component via the connection device 320, and control commands may be passed from the mobile device 200 over the connection device 320 to configure a Wi-Fi interface 340 of the component so that the component may join the Wi-Fi network 370. For example, in response to input on the user interface of the configuration app 270, control commands may be sent over the connection device 320 to configure a network name (e.g., a service set identifier (SSID), a security type (e.g., Wired Equivalent Privacy (WEP), Wi-Fi Protected Access (WPA), etc.) a password (e.g., a SSID password), addresses (e.g., an Internet Protocol (IP) address of the component, a subnet mask, an IP address of a router, etc.) used to join the Wi-Fi network. Further, control commands may be passed from the mobile device 200 over the connection device 320 to configure other hardware and software 350 of the component 320. For example, in response to input on the user interface of the configuration app 270, control commands may be sent to configure the component's role. bindings and controller settings, firmware, etc.

A universal asynchronous receiver/transmitter (UART) protocol and related application program interface (API) may support the exchange of these control commands. Under the protocol, the mobile device 200 may operate as a controller node, the connection device 310 may operate as a transparent middle node, and the component 330 may operate as a subordinate node. To establish communication, the mobile device 200 initially sends a common state packet over the connection device 310. The common state packet includes a UART pass-through command that instructs the connection device 310 to bridge communications. When the connection device 310 receives the common state packet, it determines a bus type of the interface the packet was received on, and detects the UART pass-through command. Based on the bus type and UART pass-through command, the connection device determines that the packet should be re-framed and sent out from a UART of the connection device 310 to the component 330. The packet is then received by the component 330. An acknowledgement packet may be sent back from the component 330 to the mobile device 200. The acknowledgment packet may include an uplink flag to indicate the direction of travel. When the connection device 310 sees a packet with the uplink flag set, it may includes a UART pass-through command in the packet, and then forward it onward to the mobile device 200. Upon receipt at the mobile device, the UART pass-through command is used to distinguish between information originating at the connection device 310 and at the component 330. Through exchange of packets back and forth over the connection device 310, a communication channel is established between the mobile device 200 and component 330, usable when communication is not yet possible via the Wi-Fi network 370.

Figure 4:
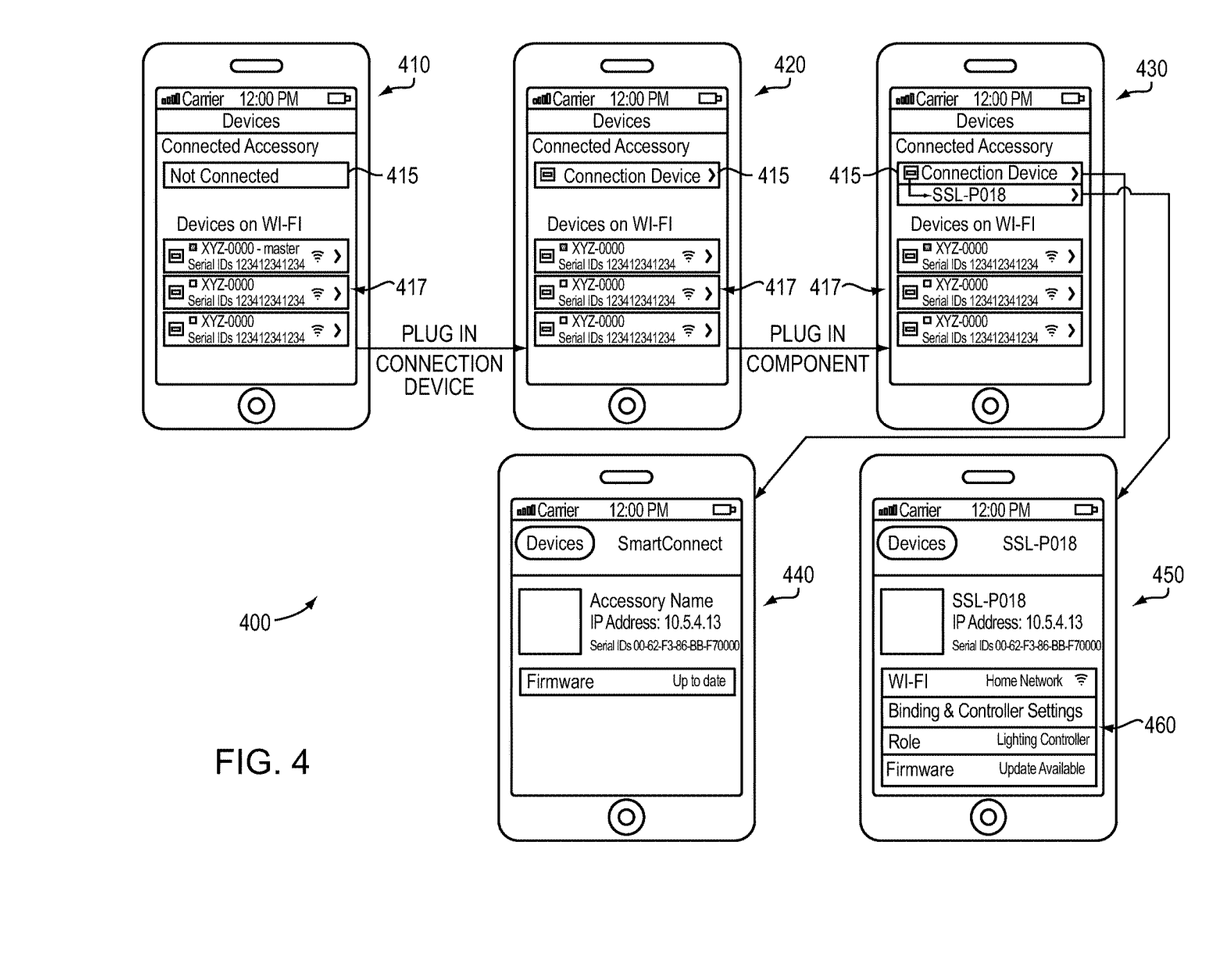
FIG. 4 is a series of views of an example mobile device, showing an example user interface on the touch sensitive display screen while the connection device and component are being coupled to the mobile device.

FIG. 4 is a series of views 400 of an example mobile device 200, showing an example user interface on the touch sensitive display screen 240 while a connection device 310 and component 320 are being coupled to the mobile device. In view 410, the connection device is still disconnected from the mobile device, and a status of "not connected" is indicated in a connected accessory display area 415. Other components accessible on the Wi-Fi network are indicated in Wi-Fi display area 417. The mobile device 200 detects when the connection device 310 is connected to it, and updates the view. In view 420, the connection device 310 is now connected to the wired serial communication interface 250 of the mobile device, but not to the component 320. The connection device 310 is indicated in the connected accessory display area 415. The mobile device 200 detects when a component is connected to the connection device 310 and updates the view. In view 430, the component 320 is now connected to the connection device 310. The component 310, here a controller having the model number "SSL-P018", is indicated in the connected accessory display area 415. In view 440, the user has selected the connection device in the connected accessory display area 415, and additional information about the connection device 310 is shown. In view 450, the user has selected the component in the connected accessory display area 415, and a main menu 460 for the component is shown. Using the main menu 460, the user may configure the component 320 to join the Wi-Fi network as well as configure additional settings of the component. When the component 320 has joined the Wi-Fi network, it may be shown in the Wi-Fi display area 417 of the views 410-430, for subsequent access.

Figure 5:
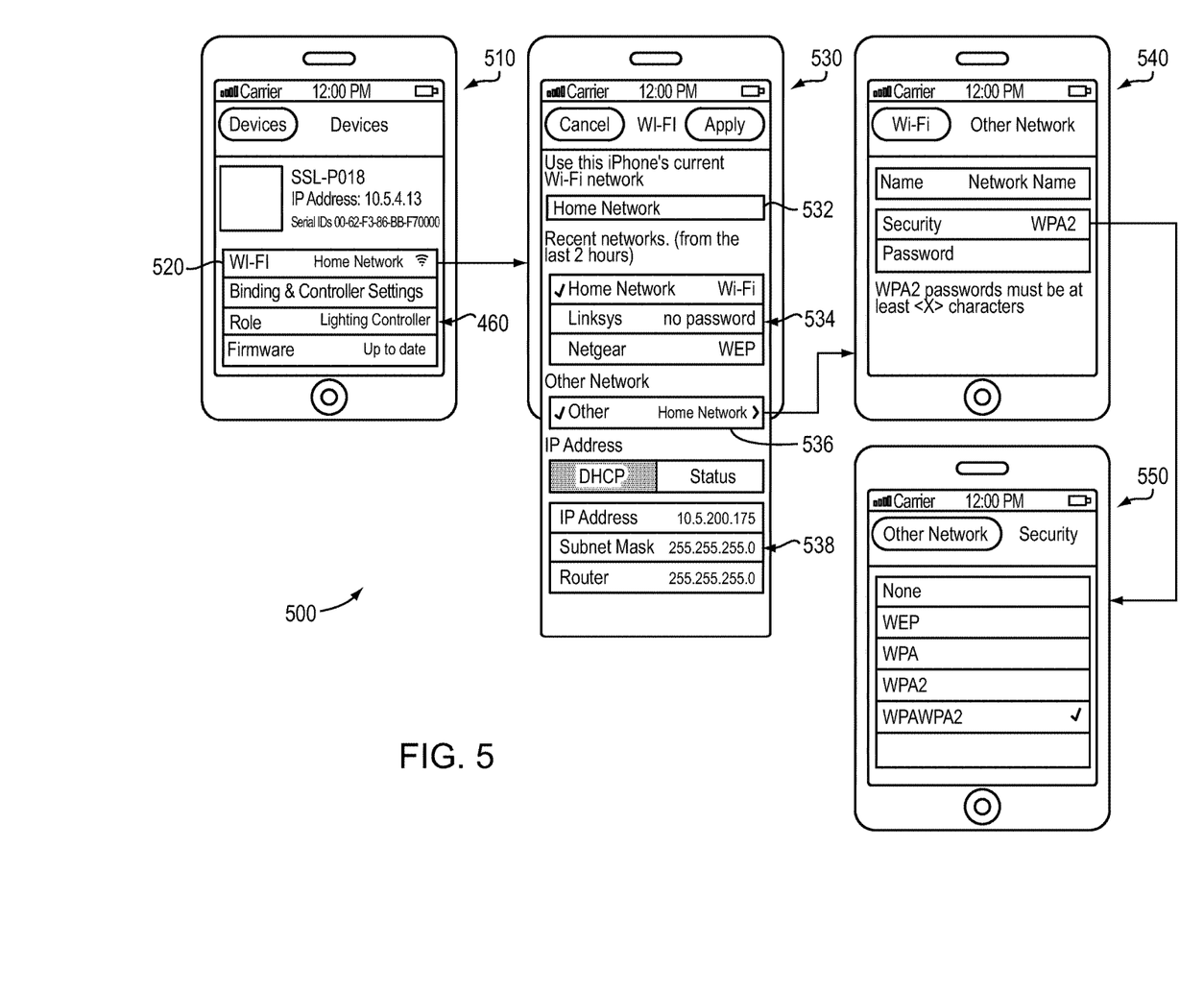
FIG. 5 is a series of views of an example mobile device showing an example user interface while a user configures a component to join a Wi-Fi network.

FIG. 5 is a series of views 500 of an example mobile device 200, showing an example user interface while a user configures a component 320 to join a Wi-Fi network. From the main menu 460 in view 510, a user may select an option 520 to configure the Wi-Fi settings of the component 320, and view 530 is then shown. In view 530, the user interface shows a current Wi-Fi network that the mobile device 200 is connected to in area 532, and recently joined Wi-Fi networks in area 534. For these Wi-Fi networks, a network name, security, password, addresses and other information are already known by the mobile device 200. Still other accessible networks may be shown in area 536. A user may need to enter a network name, security, password, addresses and/or other information if one of these networks is desired, as shown in views 540 and 550. Addresses may also be entered using area 538 in view 530. In response to the user input entered in views 540, 550 and in area 538, the mobile device 200 sends control commands via the connection device 310 to the component 320 to configure the network name, security type, password, addresses, etc. to cause the component to join the Wi-Fi network. Once the component 320 has joined the Wi-Fi network, further control commands may be sent to the component 320 via the connection device 310 or via the now-accessible Wi-Fi network.

Figure 6:
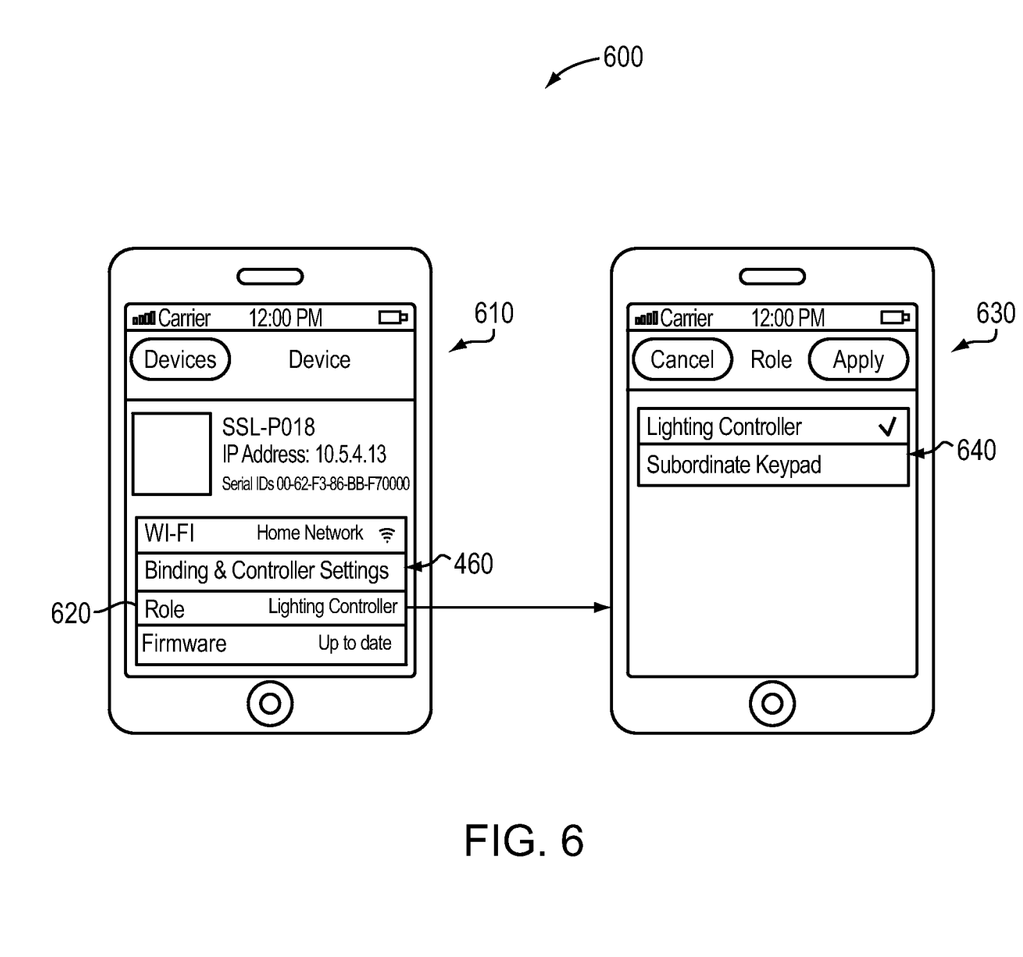
FIG. 6 is a series of views of an example mobile device, showing an example user interface while a user configures a role of a component in the home automation system.

FIG. 6 is a series of views 600 of an example mobile device 200, showing an example user interface while a user configures a role of a component 320 in the home automation system. From the main menu 460 shown in view 610, a user may select an option 620 to configure a role of the component 320, and an updated view 630 is shown. In view 630, various available roles for the component 320 are displayed in an area 640, and the user selects a desired role. In response to the user input, the mobile device 200 sends control commands to the component 320 to configure the role.

Figure 7:
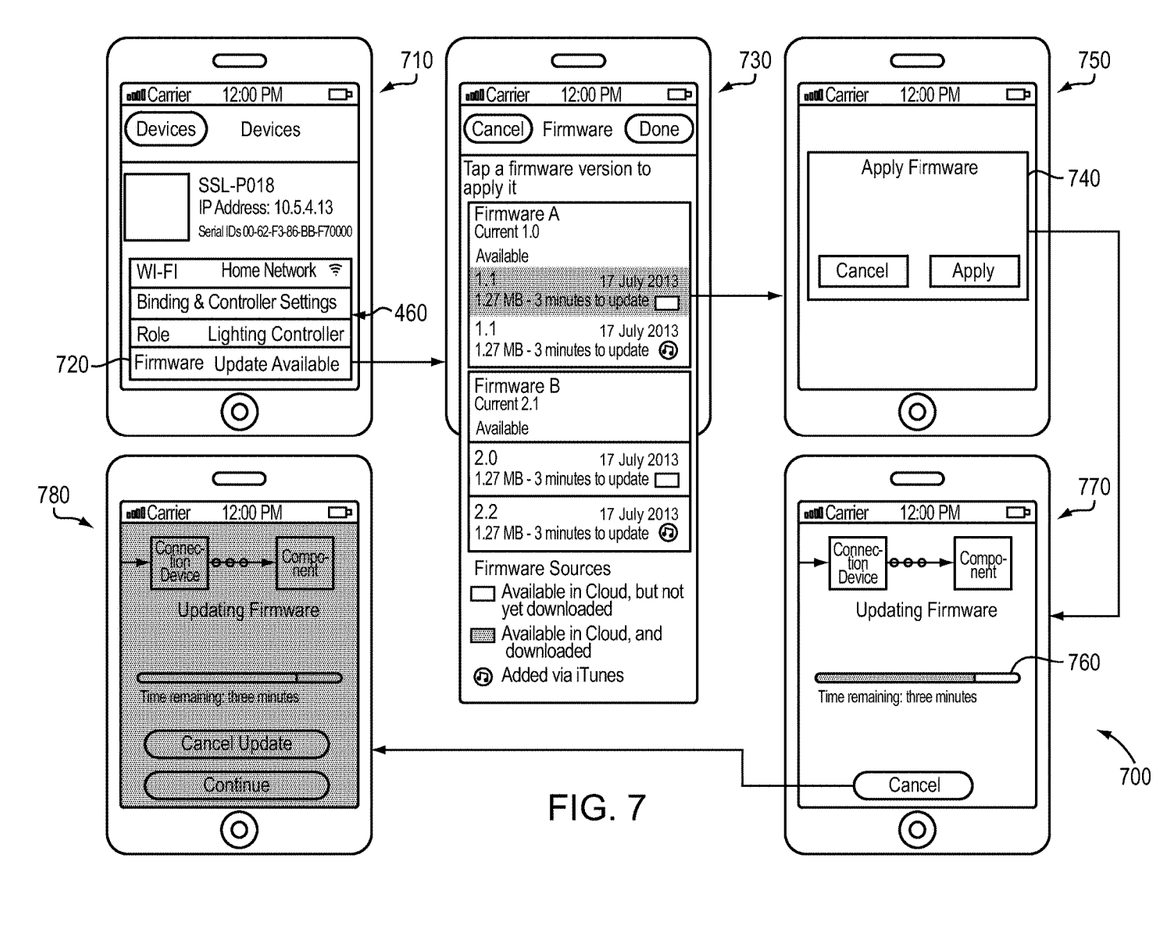
FIG. 7 is a series of views of an example mobile device, showing an example user interface while a user updates firmware of a component.

FIG. 7 is a series of views 700 of an example mobile device 200, showing an example user interface while a user updates firmware of a component 320. From the main menu 460 shown in view 710, a user may select an option 720 to configure firmware, and an updated view 730 is shown. In view 730, various available firmwares, and versions thereof are shown. Firmware may be locally stored on the mobile device 200, or available in an online repository accessible by the mobile device 200. Upon selection of a firmware and version by the user, the user interface displays a confirmation prompt 740, as shown in view 750. In response to user confirmation, the firmware is transferred from the mobile device 200 to the component 320. A status display 760 is presented as the firmware is transferred, as shown in view 770. A user may be able to cancel the transfer prior to its completion, as shown in view 780

Figure 8:
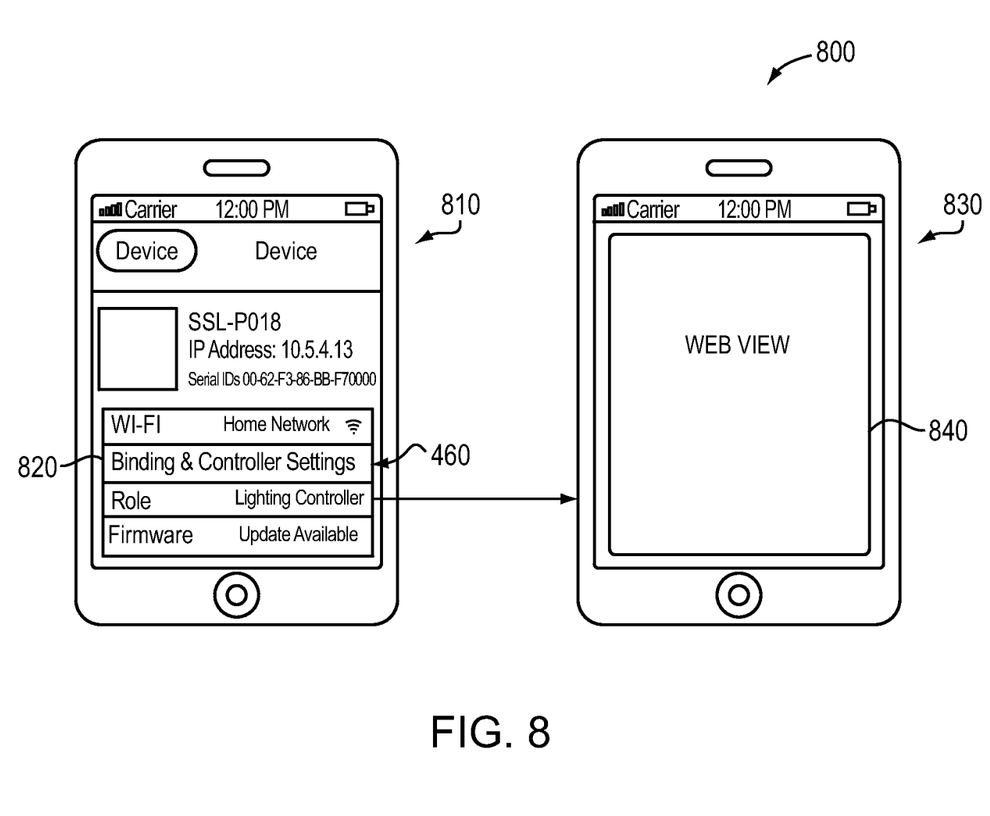
FIG. 8 is a series of views of an example mobile device, showing an example user interface while a user configures bindings and controller settings.

FIG. 8 is a series of views 800 of an example mobile device 200, showing an example user interface while a user configures bindings and controller settings. From the main menu 460 shown in view 810, a user may select an option 820 to configure the bindings and controller settings. Upon selection, a web interface 840 displays controls for manipulating the bindings and controller settings, as shown in view 820. The web interface may be provided from the component 320 or another source, and the mobile device 200 may simply load and display webpages provided, without understanding their content.

Figure 9:
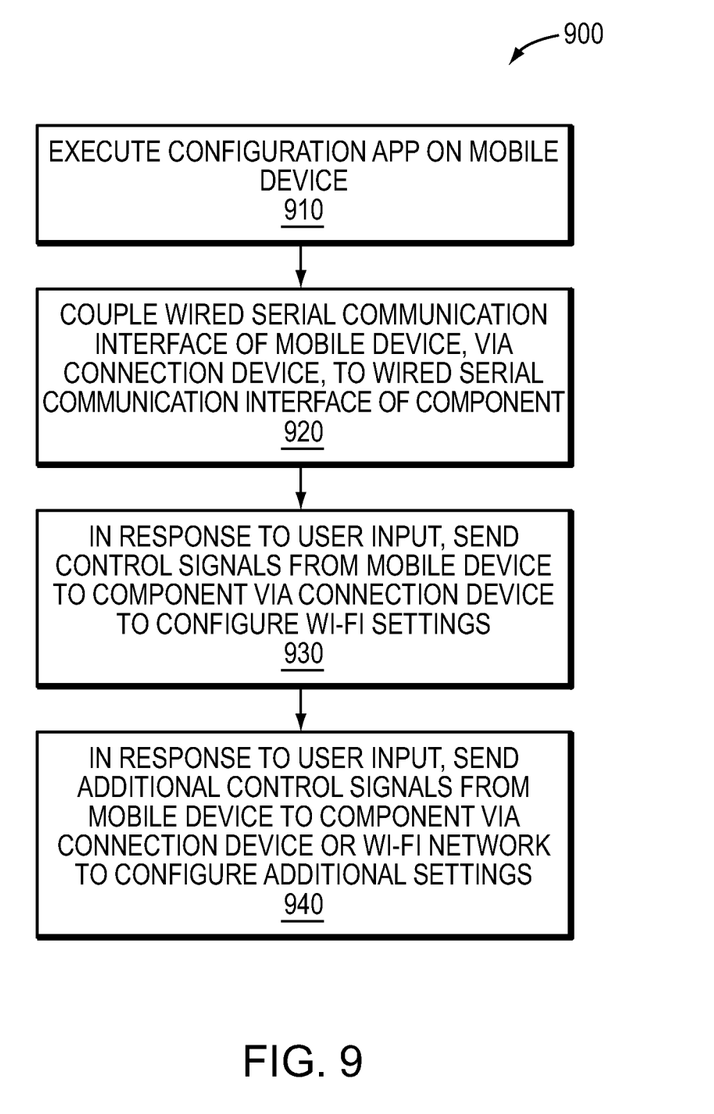
FIG. 9 is a flow chart of an example sequence of steps to configure a component of a home automation system that is initially is inaccessible on a Wi-Fi network.

FIG. 9 is a flow chart of an example sequence of steps 900 to configure a component of a home automation system that is initially is inaccessible on a Wi-Fi network. The sequence of steps 900 may summarize aspects of the above discussed operation. At step 910, a configuration app is executed on a mobile device. A user interface of the configuration app is displayed on a touch-sensitive display screen. At step 920, a connection device is used to couple the mobile device to the component which is initially inaccessible on the Wi-Fi network. The connection device couples a wired serial communication interface of the mobile device to a wired serial communication of the component. At step 930, in response to input entered in the user interface being displayed on the touch-sensitive display screen, the mobile device sends control signals to the component via the connection device to configure Wi-Fi settings of the component, to cause the component join the Wi-Fi network. At step 940, in response to further input entered in the user interface being displayed on the touch-sensitive display screen, the mobile device sends additional control signals to the component via the connection device or the Wi-Fi network to configure additional settings of the now Wi-Fi accessible component.

It should be understood that various adaptations and modifications may be made within the spirit and scope of the embodiments discussed herein. Further, it should be understood that at least some portions of the above-described techniques may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example.

The invention claimed is:

1. A method for configuring a component of a home automation system that initially is inaccessible on a Wi-Fi network to be able to interact with one or more other components of the home automation system over the Wi-Fi network, comprising:

executing a configuration application (app) on a mobile device having a touch-sensitive display screen, a user interface of the configuration app being displayed to a user on the touch-sensitive display screen;

coupling the mobile device to the component of the home automation system that initially is inaccessible on the Wi-Fi network via a connection device, the connection device connecting a wired serial communication interface of the mobile device to a wired serial communication interface of the component and capable of operating as a transparent middle node in response to a pass-through command;

in response to input entered in the user interface being displayed on the touch-sensitive display screen, sending control signals from the mobile device to the wired serial communication interface of the component via the connection device to configure Wi-Fi settings of the component to cause the component to join the Wi-Fi network, the control signals to include the pass-through command to cause the connection device to forward the control signals to the component; and in response to additional input entered in the user interface being displayed on the touch sensitive screen, sending additional control signals from the mobile device to the wired serial communication interface of the component via the connection device to at least one of assign the component a role within the home automation system and bind the component to a controller of the home automation system, the additional control signals to include the pass-through command to cause the connection device to forward the control signals to the component, wherein the sending control signals and the sending additional control signals via the connection device renders the component able to interact over the Wi-Fi network with the one or more other components of the home automation system during ongoing operation of the home automation system.

2. The method of claim 1, wherein the mobile device is a smartphone.

3. The method of claim 1, wherein the wired serial communication interface of the mobile device is a Lightning interface and the wired serial communication interface of the component is an RS232 interface.

4. The method of claim 1, wherein the wired serial communication interface of the mobile device is a Universal Serial Bus (USB) interface and the wired serial communication interface of the component is an RS232 interface.

5. The method of claim 1, wherein the mobile device operates as a controller node, and the component operates as a subordinate node, and the control signals are packets sent from the controller node that include a universal asynchronous receiver/transmitter (UART) pass-through command to cause the connection device to forward the packets from a UART to the subordinate node.

6. The method of claim 1, wherein the home automation system controls lighting devices, and the component is a lighting controller.

7. The method of claim 1, wherein the component is a keypad.

8. The method of claim 1, further comprising:
executing a control app on the mobile device or another mobile device, the control app configured to control ongoing operation of the home automation system after the Wi-Fi settings and the role and binding of the component have been configured, by sending further control signals to the component via the Wi-Fi network.

9. The method of claim 1, further comprising:
sending further control signals from the mobile device to the component via the Wi-Fi network to configure further settings of the component.

10. A system for configuring a component of a home automation system that initially is inaccessible on a Wi-Fi network to be able to interact with one or more other components of the home automation system over the Wi-Fi network, comprising:
a mobile device having a processor, a memory, a wired serial communication interface, and a touch sensitive display screen, wherein the memory is configured to store a configuration application (app), the touch sensitive display screen is configured to show a user interface of the configuration app, and the processor is configured to execute the configuration app, and the configuration app, when executed, is configured to
send control commands over the wired serial communication interface in response to input entered in the user interface, the control commands to configure Wi-Fi settings of the component of the home automation system that is initially inaccessible on the Wi-Fi network to cause the component to join the Wi-Fi network, the control signals to include a pass-through command, and to
send additional control signals from the mobile device to the component via the connection device to at least one of assign the component a role within the home automation system and bind the component to a controller of the home automation system, the additional control signals to include the pass-through command; and
a connection device coupled to the wired serial communication interface of the mobile device and a wired serial communication interface of the component, the connection device configured to operate as a transparent middle node between the mobile device and the component in response to the pass-through command and propagate the control commands there between,
wherein, the control signals and the additional control signals sent via the connection device render the component able to interact over the Wi-Fi network with the one or more other components of the home automation system during ongoing operation of the home automation system.

11. The system of claim 10, wherein the mobile device is a smartphone.

12. The system of claim 10, wherein the wired serial communication interface of the mobile device is a Lightning interface and the wired serial communication interface of the component is an RS232 interface.

13. The system of claim 10, wherein the wired serial communication interface of the mobile device is a universal serial bus (USB) interface and the wired serial communication interface of the component is an RS232 interface.

14. The system of claim 10, wherein the mobile device is configured to send packets to the connection device that include a universal asynchronous receiver/transmitter (UART) pass-through command, and the connection device, in response, forwards the packets out a UART.

15. The system of claim 10, wherein the home automation system controls lighting devices, and the component is a lighting controller.

16. The system of claim 10, wherein the component is a keypad.

17. The system of claim 10, wherein the memory of the mobile device is further configured to store a control app, the control app, when executed by the processor of the mobile device, to control ongoing operation of the home automation system after the Wi-Fi settings and the role and binding of the component have been configured, by communicating with the component via the Wi-Fi network.

18. The system of claim 10, wherein the configuration app, when executed, is further operable to send further control signals to the component via the Wi-Fi network to configure further settings of the component.

19. The system of claim 10, further comprising:
another mobile device having a processor, a memory, and a Wi-Fi interface, wherein the memory is configured to store a control app, the control app, when executed by the processor of the mobile device, to control ongoing operation of the home automation system after the Wi-Fi settings and the role and binding of the component have been configured, by communicating with the component via the Wi-Fi network.

20. A mobile device for configuring a component of a home automation system that initially is inaccessible on a Wi-Fi network to be able to interact with one or more other components of the home automation system over the Wi-Fi network, comprising:
a touch sensitive display screen;
a wired communication interface;
a Wi-Fi interface;
a memory configured to store a configuration application (app); and
a processor configured to execute the configuration app, the configuration app, when executed, operable to
in response to input entered on the touch sensitive display screen, send control signals from the mobile device over the wired communication interface to a connection device, the control signals including Wi-Fi settings of the component of the home automation system that initially is inaccessible on the Wi-Fi network system and a pass-through command to cause the connection device to forward the control signals to the component to cause the component to join the Wi-Fi network, and
in response to further input entered on the touch sensitive display screen, send additional control signals from the mobile device to the now Wi-Fi accessible component via the Wi-Fi network to configure additional settings of the now Wi-Fi accessible component,
wherein the control signals sent via the connection device and the additional control signals sent via the Wi-Fi network render the component able to interact over the Wi-Fi network with the one or more other components of the home automation system during ongoing operation of the home automation system.

21. The mobile device of claim 20, wherein the mobile device is a smartphone.

22. The mobile device of claim 20, wherein the component is a lighting controller.

* * * * *